Feb. 21, 1961 G. M. HOLUB 2,972,189
INSTRUMENT FOR TESTING WHEEL ALIGNMENT OF AUTOMOBILES
Filed Aug. 3, 1953 5 Sheets-Sheet 1

INVENTOR.
GEORGE M. HOLUB
BY
ATTORNEY

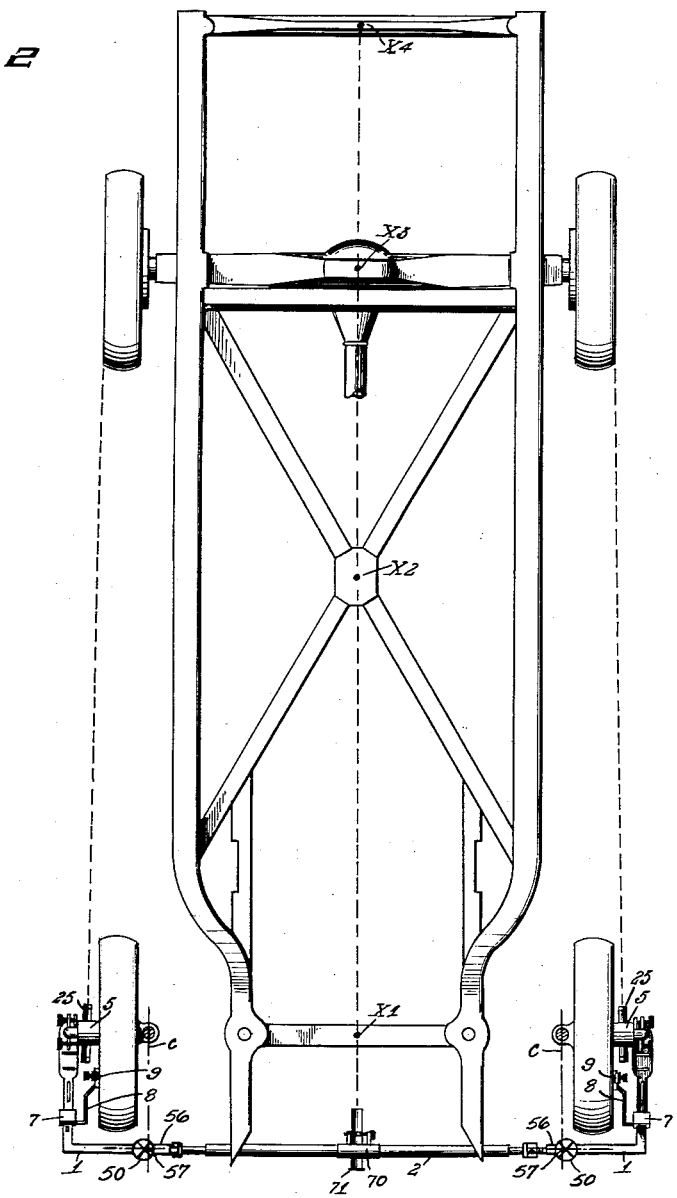

Feb. 21, 1961  G. M. HOLUB  2,972,189
INSTRUMENT FOR TESTING WHEEL ALIGNMENT OF AUTOMOBILES
Filed Aug. 3, 1953  5 Sheets-Sheet 3
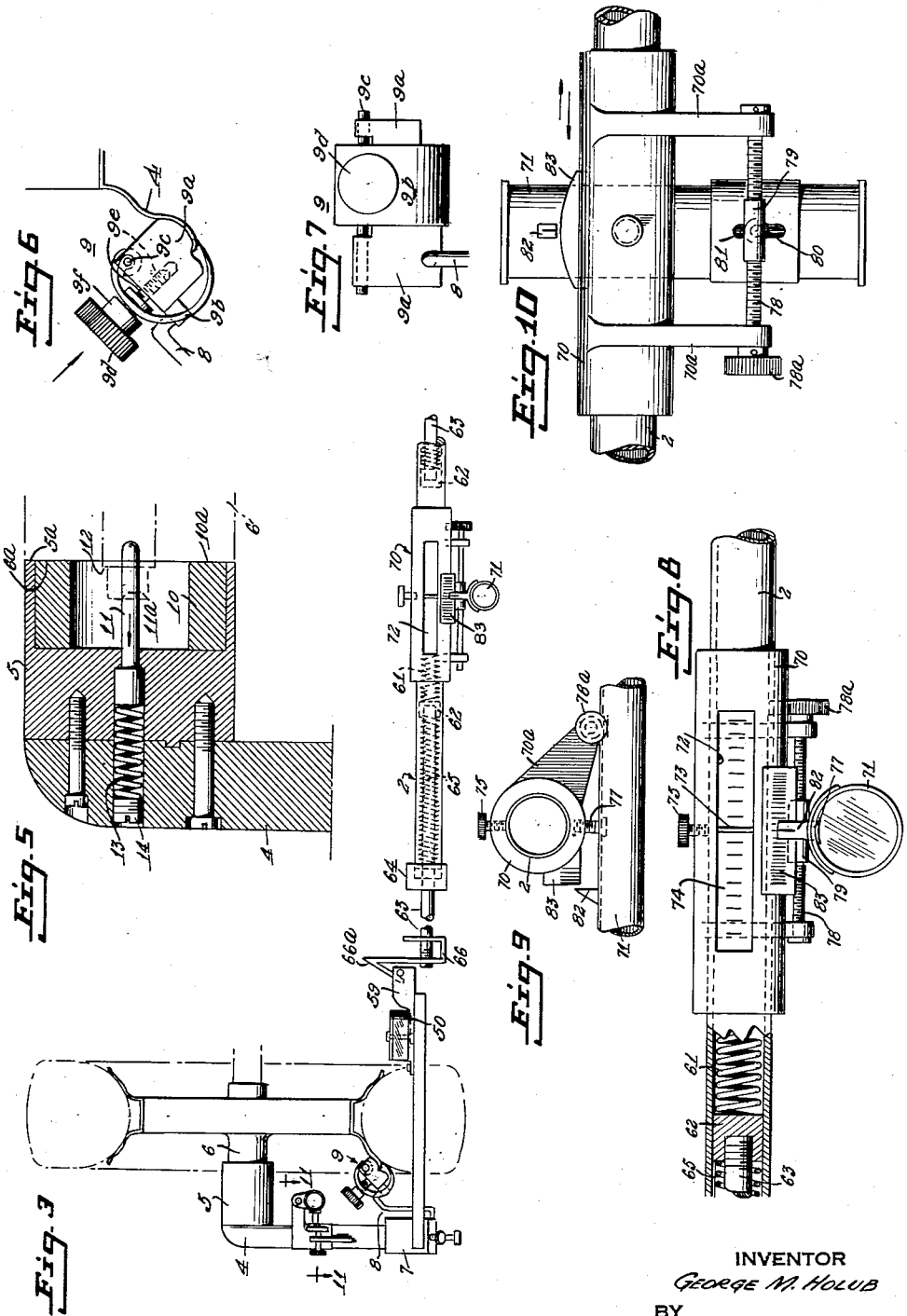
INVENTOR
GEORGE M. HOLUB
BY
Frederick B. Cave
ATTORNEY

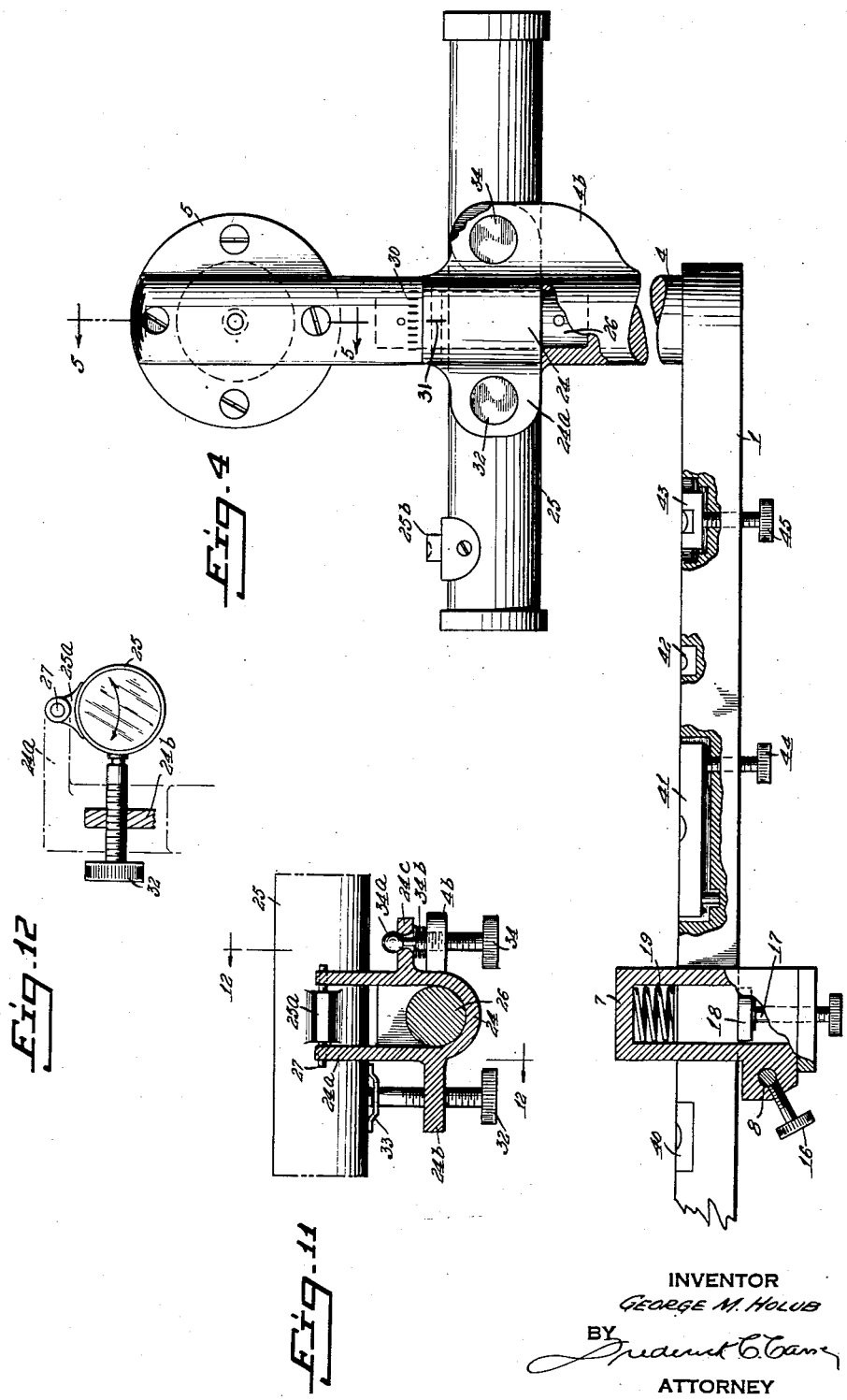

Feb. 21, 1961 G. M. HOLUB 2,972,189
INSTRUMENT FOR TESTING WHEEL ALIGNMENT OF AUTOMOBILES
Filed Aug. 3, 1953 5 Sheets-Sheet 5
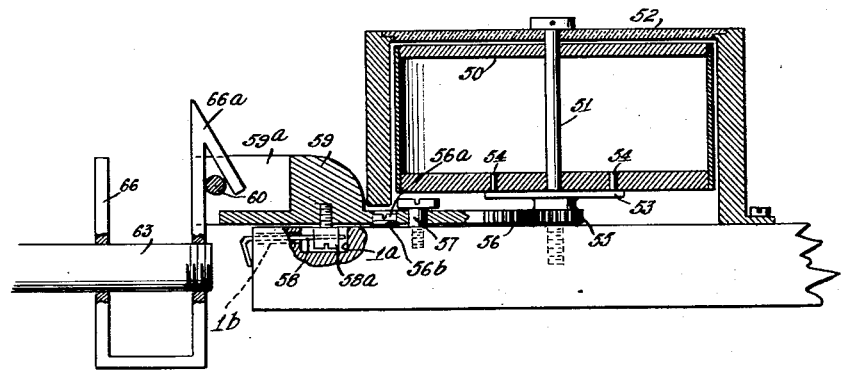
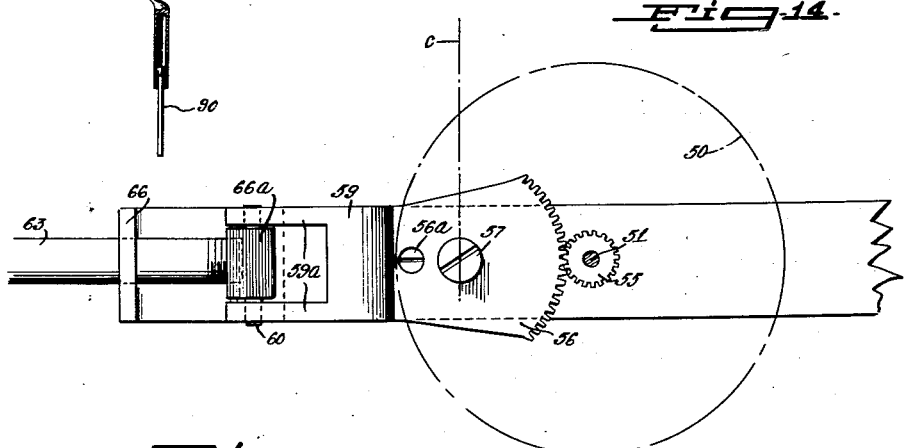
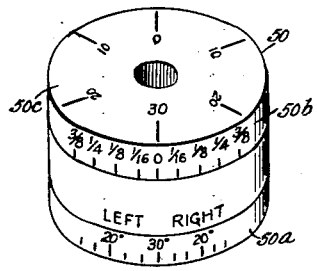
INVENTOR
GEORGE M. HOLUB
BY
ATTORNEY

United States Patent Office 2,972,189
Patented Feb. 21, 1961

2,972,189

**INSTRUMENT FOR TESTING WHEEL ALIGN-
MENT OF AUTOMOBILES**

George M. Holub, 2396 Cambridge St.,
East Meadow, N.Y.

Filed Aug. 3, 1953, Ser. No. 371,980

16 Claims. (Cl. 33—46)

This invention relates to an instrument for checking and measuring wheel alignment, tracking and the alignment of the frame or chassis, including the relation of the frame, front end and rear housing, of automobiles and other four wheel vehicles.

The principal factors in checking wheel alignment are caster, camber, king pin inclination, toe-in and toe-out on curves or steering geometry. These terms are well understood in the art. "Caster" is the backward tilt of the king pin at the top and is measured in degrees from the vertical. "Camber" is the outward or sideward tilt of the front wheels at the top and is measured in inches or degrees. "King pin inclination" is the outward or sideward tilt of the king pins at the bottom. "Toe-in" is the drawing together of the front wheels at the front, or stated another way, it is the condition whereby the distance between the front wheels is less at the front than it is at the rear. "Toe-out on curves" or "steering geometry" is the relationship between the front wheels on turns, controlled by the angle of the spindle steering arms, the object of this relationship being to allow the front wheels to turn about a common center and thus prevent the inside wheel from dragging sideways.

Since the proper tracking makes for easier steering and prevents excessive tire wear, it is ordinarily considered part of wheel alignment testing. "Tracking" is the condition whereby the rear wheels of the car follow the front wheels in parallel relation, and is checked by determining whether the car is shorter on one side or the other.

A check of tracking will ordinarily, although not necessarily always, indicate misalignment of the frame or chassis, however, it does not locate or pin-point the trouble; moreover, tracking does not indicate whether the frame, the front end and the rear housing are in proper relationship.

The present invention provides means whereby all of the above checks can be made accurately.

The existing equipment presently available is elaborate and expensive, requiring the installation of a pit, a ramp, testing equipment mounted permanently in fixed relation to the pit and ramp, and requires a wide variety of auxiliary gauges and testing equipment. The accuracy of the results obtained with this equipment is not always in keeping with its elaborateness and cost. For example, on one type of the automobile is driven onto the ramp with the front wheels positioned on rotatable discs. During the course of the testing, the wheels are adapted to be turned to the right and to the left to fixed angular positions, the angles being determined by the angle of rotation of the discs. Because the wheels pivot about the king pins, which are not coincident with the pivot points of the discs, and because of the possible slippage of the tires on the top surfaces of the discs, the angular position of the wheels will not necessarily correspond with the reading on the discs.

Also, in taking the necessary data for checking wheel alignment, the permanent installations usually employ a pair of wheel engaging abutment arms which serve as reference points for taking the necessary data. The abutment arms are usually designed and intended for engagement with the side wheels of the tires, the inner or outer faces of the wheels, or the felloes of the rims, all of which are unsatisfactory reference planes because of the variances caused by different types of tires, the pressures of the tires, or deformed or bent rims or felloes. In taking all of the pertinent data for checking wheel alignment, the abutment arms have to be disengaged from the wheels and rotated from horizontal to vertical positions.

A further disadvantage of existing equipment is that there is no provision for identifying and isolating misalignment in the frame or in the relation of the frame, front end and rear housing. For example, if a check shows tracking to be off, the trouble may be due to a wide variety of different faulty conditions, such as a swayed frame, a diamond frame, swung rear, shifted front or rear, etc. Moreover, in most checking technique if tracking appears to be satisfactory, it is assumed that no misalignment exists, unless it is obvious to the eye, when as a matter of fact, various serious misalignments, often a very complex nature, may exist.

The present invention has for its object the provision of testing equipment which will overcome the above objections and difficulties, and which, in addition to providing a high degree of accuracy, is simple in construction, inexpensive and easy to use. The present testing apparatus is portable, requiring no permanent installation; in fact, when operatively mounted on the vehicle, it is entirely suspended off the ground. The various indicators are easy to read and are located for the convenience of the operator. The apparatus is adapted to be accurately mounted against the flat machined surface of the wheel hub and centered with respect to the wheel spindle. The flat machined surface of the wheel hub affords a highly satisfactory reference plane for taking the various data. Once operatively mounted on the vehicle, all of the pertinent data can be obtained without any necessity of disengaging the apparatus from the wheel. In addition, because the apparatus is so easily transportable, it can be used to check the rear wheels.

A very special feature of the present invention is its capabiilty of locating and measuring misalignment in the frame, and of the relation of the frame, the front end and the rear housing.

Another feature is the ability to check tracking accurately without first correcting camber.

These and other features of the present inevntion will be apparent and more fully understood by reference to the description which follows and the accompanying drawings.

Referring to the drawings:

Fig. 2 is a top plan view of an automobile frame with the present invention mounted thereto.

Fig. 3 is a front elevation of a portion of the present apparatus.

Fig. 4 is a side elevation of the present apparatus.

Fig. 5 is a cross-section view taken along the line 5—5 of Fig. 4, looking in the direction of the arrows.

Fig. 6 is an enlarged view of a rim clamp shown in Fig. 3.

Fig. 7 is a view of the clamp looking in the direction of the arrow in Fig. 6.

Fig. 8 is a front view of a portion of the apparatus mounted on the front connection between the wheels.

Figs. 9 and 10 are side and top views, respectively, of part of the apparatus shown in Fig. 8.

Fig. 11 is a cross-section view taken along the line

Figure 1:
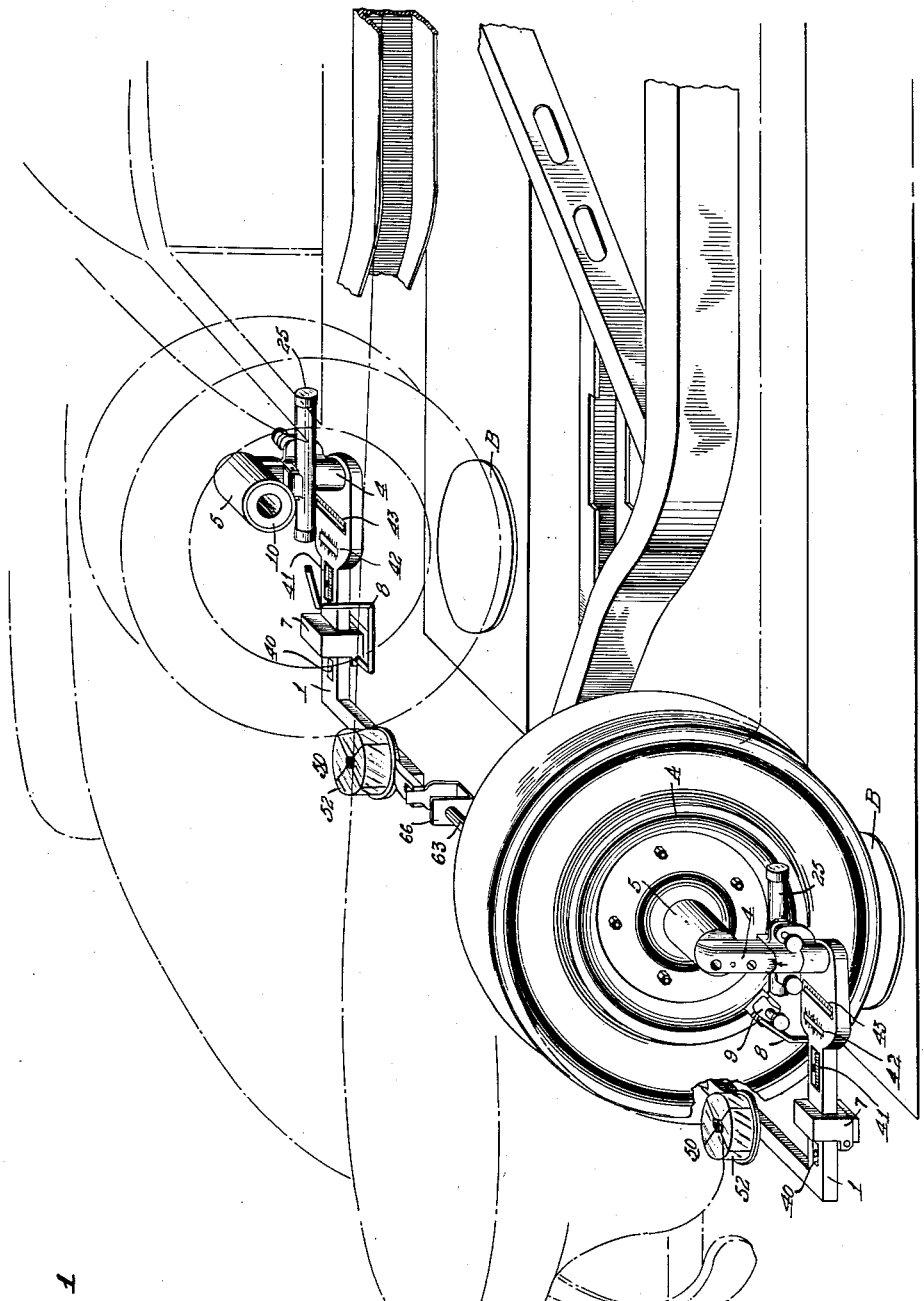
Fig. 1 is a perspective view of the present invention as operatively mounted on an automobile.

11—11 of Fig. 3 looking in the direction of the arrows.

Fig. 12 is a cross-section view taken along the line 12—12 of Fig. 11.

Fig. 13 is a front cross-section view of one of the indicators.

Fig. 14 is a top view of the control means for the indicator shown in Fig. 13.

Fig. 15 is an isometric view of the indicator shown in Fig. 13.

Fig. 16 is a view of a plumb bob having a magnetic head used in the present invention.

The automobile to be tested is driven onto a flat surface, and for purposes of convenience only, the front wheels may be driven onto rotatable discs B to facilitate their turning. Referring especially to Figs. 1 and 2, the present invention, as attached to the automobile, comprises generally a pair of horizontally disposed L-shaped arms 1 held magnetically to the sides of the wheels, said arms extending forwardly to the front of the car and then at right angles toward one another, a long biased connecting member 2 extending across the front of the car and supported between the members 1, and a slidable carriage 70 adjustably supported on the member 2. The side arms 1 are attached to the wheels by vertical columns 4 having oppositely disposed mounting heads 5 at their upper ends. The heads 5 are formed with internal circular recesses, which recesses accommodate annular permanent magnetic rings 10. As shown in Fig. 5, the outer exposed edges 10a of the magnetic rings 10 are mounted flush in the same vertical plane with the wheel engaging faces 5a of the heads 5, and the head is adapted to be magnetically attached to the vertical machined surfaces 6a of the wheel hubs 6.

The heads 5 are accurately centered, positioned and aligned with their respective wheel hubs by means of spring pressed plungers 11 contained within and centrally located in the recesses of the heads. Normally the wheel engaging ends of the plungers extend beyond the wheel engaging faces of the magnetic rings and the mounting heads, however, the plungers are adapted to be inserted in axial countersunk holes, formed in the ends of the wheel spindles, in which position the plungers are depressed. The other ends of the plungers are provided with cylindrical collars 11a which are movable within horizontal circular borings extending through the columns 4 and the mounting heads 5. Compression springs 13 are sealed within the borings by threaded end plugs 14, and the springs urge the plungers against shoulders formed in the borings. The shoulders define the normal extended positions of the plungers.

As shown in Fig. 3, the side arms 1 are given added support by rim clamps 9 connected by bent rods 8 to slidable blocks 7 supported on the side arms 1, the side arms passing through vertical slots in the blocks 7. As shown in Fig. 4, a screw having a friction collar 18 at the upper end thereof is threaded through the underside of the block 7, and a compression spring 19 is accommodated within the upper portion of the block 7 in order to permit a limited amount of vertical adjustment of the housing 7 on the side arm 1. Also, the bent rods 8 which support the rim clamps 9 are slidably mounted in transverse holes formed in the members 7, so that the clamps 9 may be moved toward and away from the sides of the wheels as desired. The blocks 7 carry threaded screws 16 therein to permit the bars 8 to be locked in the desired positions. In taking the data for determining wheel alignment, the wheels must be turned to different angular positions, and at times it becomes necessary to adjust the side arms 1 to horizontal positions, and this adjustment can ordinarily be made without releasing the clamp 9 from the locked position on the rim; however, the clamp 9 is pivotally connected to the end of the bent bar 8 so that, if necessary, it can be clamped to different angular positions along the rim of the wheel.

As shown in Figs. 6 and 7, the rim clamps 9 each comprise a solid body portion 9a adapted to seat in the curved lip of the wheel rim, designated by the reference character A, a curled flexible clamp 9b attached to the top of the body portion by a pin 9c and adapted to engage the opposite side of the rim, and a knurled knob 9d having a stem 9e which passes through a slot in the flexible clamp member 9b and is threaded into the body portion 9a. The stem 9e is provided with collars 9f affixed thereto, one on each side of the flexible clamp, so that the turning of the knob will control the opening and closing action of the flexible clamp 9b toward and away from the rim engaging surface of the body portion 9a. The body portion 9a is pivotally mounted by threads to the end of the rod 8 so that the clamp 9 may be angularly adjusted according to the position on the rim to which it is to be attached.

As best shown in Figs. 4, 11 and 12, eye sights or optical telescopes 25 are supported from horizontally pivoted turrets 24 for the purpose of checking tracking. The turrets pivot on vertical shafts 26 which connect the upper and lower ends of the columns 4. Referring especially to Fig. 4, which shows the left wheel assembly, the telescope 25 is suspended from a pair of horizontal arms 24a of the turret. A pin 27 supported between the arms passes through a boss 25a formed in the top of the telescope, hence the telescope is permitted limited pivotal movement on the pin, as indicated by the arrows in Fig. 12, for purposes of adjustment. The telescope is aimed at a specific point on the respective rear wheel, usually the outer surface of the rear tire, and the angular position of the telescope noted by a scale 30 on the vertical column 4 and a marker 31 movable with reference to the scale on the pivotal turret 24.

It should be understood that any sighting devices may be employed in lieu of the optical telescopes. In the drawings, the telescopes are shown in their simplest form for purposes of illustration only; in their commercial embodiment, for the convenience of the operator, they should include vertical eye pieces and 45° mirrors so that the sightings may be taken by looking down into the eye pieces, instead of from a low position in front of the horizontally disposed telescopes. The telescopes may be provided with cross-hairs so that accurate sightings can be taken.

In order that the telescopes may be leveled to a horizontal position to compensate for camber, the telescopes are provided with laterally disposed liquid level gauges 25b. The telescopes 25 may be pivotally adjusted by screws 32 threaded through forward lugs 24b formed on the turrets 24. Small leaf springs 33 attached to the sides of the telescopes engage grooves formed in the screws near the ends thereof and serve to maintain the telescopes in contact with the ends of the screws 32, so that the gauges 25b can be leveled by the adjusting screws 32.

The adjustment of the telescopes 25 in a horizontal plane for the purpose of sighting the predetermined point on the rear wheels may be effected by adjustable screws 34. Each of the screws 34 is threaded through a vertical upstanding arm 4b formed integrally with the lower end of the vertical column member 4, and the screw passes through a slot, shown in Fig. 11 as having concave edges, in a rearward projecting lug 24c formed integrally with the rotatable turret 24. The screw is provided with a rounded ball or head 34a at its extreme rear end, and a light compression spring 34b is supported on the shaft of the screw between the arm 4b and the lug 24c to maintain the lug in contact with the rounded head 34a. The turning of the adjusting screw 34 rotates the entire turret 24, including the telescope 25 suspended therefrom, in a horizontal plane about the vertical shaft 26. In checking tracking, the telescopes 25 at both sides of the vehicle would be trained at the proper point on the rear wheels, and if tracking is satisfactory, the readings on the scales 30 should be substantially equal. If the readings are not equal, it indicates that tracking should be corrected.

The side arms 1 carry a number of liquid level-type gauges recessed in the top surfaces thereof. These include a fore-and-aft level 40 for indicating whether the arms 1 are horizontally disposed, a fore-and-aft level 41 for indicating king pin inclination, and laterally disposed levels 42, 43 for determining camber and caster, respectively. The levels 41, 42 and 43 are read in conjunction with adjacent scales marked on the top surfaces of the arms 1. The levels 41 and 43 are capable of being tilted as desired by set screws 44, 45, respectively, which are threaded through the undersides of the arms 1, engaging the bottom surfaces of the levels to permit them to be pivotally adjusted to zero position, as desired.

As best shown in Figs. 1, 13, 14 and 15, the front extensions of the side arms 1 support rotatable drums 50. The drums each carry a number of calibrated scales, e.g., as shown in Fig. 15, a lower scale 50a on the periphery of the cylindrical surface reading in angular degrees, a toe-in scale 50b above it reading in inches, and a circular scale 50c around the top surface also reading in angular degrees. The drum is covered with a transparent cover 52 having one or more longitudinal reference hairlines with respect to which the scales on the drum are read. In fact, to permit the scales on the drum 50 to be read from the front of the vehicle, as well as from the side, there is preferably at least two such reference hairlines, one which can be read from the front and one from the side, and scales 50a, 50b and 50c associated with each.

The drums 50 each seat upon and are pinned by means of vertical pins 54, to a concentric circular disc 53 which is, in turn, mounted to and above a pinion 55, and the drum, the disc and the pinion are all rotatably mounted on a fixed vertical spindle 51. The pinion 55 meshes with and is turned by a gear segment 56 pivotally mounted to the end of the arm 1 by a screw 57. A flexible wire or spring 58 is connected to a screw head 58a threaded in the underside of the gear segment member 56, and the spring 58 projects through a transverse channel 1b formed in the front leg of the member 1 and serves to urge the gear segment member 56 to return the drum 50 to the zero position. The end of the spring 58 may be bent to limit the rotation allowed to the gear segment. The top of the member 1 is formed with a curved groove 1a to accomodate the screw 58a in the relative movement of the gear segment member 56 and the side arm member 1. Companion metal insets 56a and 56b in the underside of the gear segment member 56 and the top surface of the member 1, respectively, provide smooth anti-friction wearing surfaces between the members.

The gear segment members 56 serve to support the tubular self-centering member 2 between them, and for this purpose, the members 56 are provided with oppositely disposed yokes 59 (Figs. 13 and 14), the arms 59a of each yoke carrying a pin 60. The tubular self-centering member 2, as shown in Figs. 3 and 8, contains a relatively heavy compression spring 61 and a pair of rods 63, which extend through and beyond the bushings 64 attached to the ends of the tubular member. The rods are slidable within the member 2, and the bushings 64 serve as wearing surfaces and guides for the movable rods. The closest ends of the rods 63 are provided with collars 62 against which the center heavy spring 61 acts, and lighter compression springs 65 are housed within the member 2 at both ends, between the collars 62 and the end bushings 64, in order to maintain the collars in contact with the spring 61 and to maintain the spring 61 centered. The lighter springs 65 are not strong enough to overcome the action of the center spring 61, so that the latter normally maintains the rods 63 in their fully expanded positions.

The extreme ends of the rods 63 are threadably connected to U-shaped brackets 66 and the brackets are formed with hooks 66a which are adapted to be supported by the pins 60 of the gear segment yokes 59. Since the center compression spring 61 overcomes the lighter end springs 65, the rods 63 will have to be moved toward each other, thereby compressing the spring 61, when the hooks 66a are engaged with their respective yoke pins 60. The end springs 65 are identical so that the member 2 is always centered between the wheels.

The yieldable connecting linkage between the gear segments maintains the gear segments 56 disposed in a straight line with the axis of the connecting linkage, even though the wheels of the vehicle be turned to different angular positions, so that the pinions 55 will follow the gear segments 56 and will be rotated at the desired ratio to turn the drums 50, the scales on the drums being proportionately calibrated to truly indicate the angular position of their respective wheels. Toward this end, it may be noted that the pivots 57 which connect the yielding linkage to the arms 1 are located forwardly of the king pins of the vehicle when the wheels are in the straight ahead position and the king pins of the wheels remain in parallelogram relationship when the wheels are turned from the straight ahead position. The front portions of the arms 1 which extend partly across the front of the vehicle serve as supports for the indicator drums 50. But more importantly, they permit the pivots 57 of the pivotal segments 56 to be located substantially directly in front of the turning pivots or king pins of the wheels when they are in the straight ahead position, so that the pivots 57 and the turning pivots of the wheels define a parallelogram regardless of the adjusted position of the wheels. This relationship is represented in Figure 2 of the drawings by the imaginary parallel lines C, each of which passes through the turning pivot of the respective wheel and the pivot 57 of the segment 56 carried by the corresponding support arm.

A carriage or housing 70 carrying a horizontally disposed fore-and-aft telescope 71 is adjustably mounted along the self-centering member 2. The carriage may be locked in the desired position by a screw 75, and the carriage is provided with an elongated slot 72 and a marker or pointer 73 (see Fig. 8) centrally located in said slot so that the housing may be adjusted transversely along the member 2 with respect to a scale 74 thereon.

As best shown in Figs. 9 and 10, the telescope 71 is suspended from the underside of the carriage 70 by a pivot 77, and the pivotal adjustment of the scope is accomplished by turning the knurled knob 78a of a threaded shaft 78, which shaft is supported in transverse horizontal relationship between a pair of downwardly inclined arms 70a of the carriage. A rider 79 is adapted to travel back and forth on the shaft 78, and a small collar 80, which travels in a fore-and-aft slot 81 formed in the top of the scope casing, is attached to the underside of the rider. The angular position of the telescope 71 can be read by a vertical fin or pointer 82 carried by the scope with reference to a circular scale 83 mounted to the front of the carriage 70.

The function of the telescope 71 is to check the alignments of the frame, as well as the relation of the frame with the front end and rear housing. In the normal position of the telescope, it will be centered between the front wheels of the vehicle and in a straight fore-and-aft position, so that its line of sight is the center line of the vehicle. As shown in Fig. 2, a number of reference points designated X1, X2, X3 and X4, may be suitably marked at the center of the vehicle, such as for example, by plumb bobs 90 (Fig. 16) attached to the vehicle by magnetic heads 91. As many reference points as desired may be marked, but they should include several at spaced intervals on the frame, so that the alignment of the frame can be checked, and one on the front end and another on the rear housing, so that they can be checked in reference to the frame. If alignment is proper, these reference points should all appear in a straight line when viewed in the telescope 71. If one or more points is not in line, the extent to which it is off can be determined by shifting the carriage 70 until the scope sights the point which is off center, and then reading the amount which the scope has been shifted on the scale 74. If the type of misalignment is one of rotation, such as a rotated front end, the degree of misalignment may be determined by rotating the telescope 71, and then reading the scale 83. At times, the misalignment may be determined from both of the scales 74 and 83, the telescope being both longitudinally translated and rotated.

Turning now to an explanation of the manner of using the present invention, with the wheels in the straight ahead position, and preferably on the discs B, the side arms 1 are mounted on their respective wheels, and the clamps 9 attached to the rims. The side arms are then leveled with reference to their liquid gauges 40 by adjusting the slides 7. The front telescope 71 is mounted between the side arms 1 by compressing the rods 63 toward each other and attaching the U-shaped brackets 66 to the yokes 59.

Toe-in can be determined by adjusting the front wheels to split the difference on the toe-in scales 50b of the drum 50. The reading on each scale will actually represent half the toe-in value. If preferred, the actual toe-in value can be read by adjusting the wheels until one reads zero, the actual toe-in value being read on the other scale.

Tracking may be checked after the toe-in has been split and the gauges 25b of the side telescope 25 leveled to compensate for camber. The scopes are aimed at their respective rear wheel targets by rotating the turrets 24 under the control of the knobs 34. The magnetically attached plumb bobs may be used as rear wheel targets, or, as stated, the scopes may be trained at specified points on the rear wheels. If the readings on the scales 30 of the columns 4 are substantially identical, tracking is presumably satisfactory, however, this fact will be verified by the center telescope 71; if the readings on the scales 30 are not the same, it is an indication of misalignment which the central telescope 71 may help to locate.

If there is no condition of misalignment, the telescope 71 should line up the various check points marked by plumb bobs, when viewed through the scope in its central fore-and-aft position. If the plumb bobs do not line up when viewed through the telescope, the location of the misalignment is generally apparent. As explained above, misalignments of translation may be measured by sliding the carriage 70, sighting the point out of line, and reading the information on the scale 74; misalignments of rotation may be measured by rotating the telescope 71 and reading the information on the scale 83. If the misalignment is one of translation and rotation, the scales 74 and 83 may be used in combination.

With the wheels still in the straight ahead position, the camber of the front wheels may be read directly from the liquid gauge levels 42, which may be read with respect to adjacent scales marked on the top surfaces of the members 1.

Before checking caster and king pin inclination, tracking, as well as any misalignments indicated by the telescope 71, should be corrected. To check caster and king pin inclination of the left wheel, the wheel to be checked is turned 20 degrees to the left of center, as indicated on either of the scales 50a or 50c of the drum 50; the respective side arm 1 is adjusted to horizontal position by leveling the gauge 40; and the king pin inclination indicating gauge 41 and the caster indicating gauge 43 both adjusted to zero. The left wheel is then turned 40 degrees to a position 20 degrees to the right of center, and the caster and king pin inclination values are read from the gauges 43 and 41, respectively. The same procedure is followed for checking the caster and king pin inclination of the other wheel. With the wheel (i.e., the right wheel) turned 20 degrees to the right of center, the gauges of the right wheel are leveled; the wheel is then turned to a position 20 degrees to the left of center and the gauges read.

Preferably all wheel alignment factors are corrected, especially toe-in, before toe-out on curves or steering geometry is checked. With one wheel, e.g. the left wheel, turned 20 degrees right from the straight ahead position, the scale 50a of the drum 50 which is associated with the other wheel, i.e. the right wheel, reads toe-out on curves. The procedure is then repeated for the other wheel, that is to say, the right wheel is turned 20 degrees to the left and the drum 50 on the left side of the vehicle is read for the toe-out on curves value.

The testing instrument of the present invention is, of course, applicable to frameless vehicles, inasmuch as it is mounted on the wheel hubs of the vehicle. In such instances, the front sight is trained along the centers of the front and rear housings to insure that they are in line in checking tracking and before checking toe-in. In many instances herein and in the claims, the term "king pin" is used to designate the turning pivot for the wheels. In these instances, the term is intended to include turning pivots generally, including the so-called ball type joints or pivots.

The invention has been shown only in preferred form and by way of example and, of course, many variations and modifications may be made therein, and in its mode of application, which will still be comprised within its spirit. It is to be understood, therefore, that the invention is not to be limited to any specific form or embodiment except in so far as such limitations are specified in the appended claims.

The invention having been described, the following is claimed:

1. A testing instrument adapted to be mounted on the front wheel hubs of a vehicle comprising a pair of rigid arms which, when the wheels are in the straight ahead position, extend forwardly from the wheel hubs along the sides of the vehicle to the front of the vehicle, mounting means connected to each of the rigid arms for attaching the respective rigid arm on the front wheel hubs of the vehicle, each of the mounting means including a mounting head which abuts against a reference surface of the wheel hubs, a biased connection of variable length suspended across the front of the vehicle between the rigid arms, detachable coupling means connecting the ends of the biased connection with the forward ends of the rigid arms, indicating means carried in fixed position on each of the rigid arms which are indicative of the angular disposition of the biased connection and the respective rigid arm, and means carried on the biased connection midway between the reference surfaces defining a line of sight in a fore-and-aft direction with respect to the vehicle for comparison with points midway between the sides of the frame of the vehicle.

2. A testing instrument as set forth in claim 12 in which the biased connection includes at least three elements mounted for relative movement, said elements including end elements and an intermediate element, and means for centering the intermediate element with respect to the ends of the biased connection, the means defining a line of sight being carried by the automatically centered intermediate element.

3. A portable instrument adapted to be mounted on the front wheel hubs of a vehicle above the ground and without direct support from the ground comprising a pair of rigid arms which, when the wheels are in the straight ahead position, extend forwardly from the wheel hubs along the sidesds of the wheels, but out of contact therewith, to the front of the vehicle, mounting means connected to each of the rigid arms for attaching the respective rigid arm on the vehicle in a position above the ground and without direct support from the ground, means carried by each of the rigid arms and defining a surface which abuts against a surface surrounding the spindle, a centering pin carried by each of the rigid arms and engaging the end of the wheel spindle, the mounting means permitting the arms to be pivotally adjusted with respect to the centering pins to level the rigid arms to substantially horizontal positions, the surface surrounding the spindle defining a reference plane for the respective rigid arm and fixing the fore-and-aft position of the arm with respect to the axis of the wheel, a biased connection of variable length suspended across the front of the vehicle between the forward ends of the rigid arms, detachable coupling means connecting the ends of the biased connection with the forward ends of the rigid arms, the detachable coupling means permitting adjustment of the rigid arms to substantially horizontal positions, the said reference planes, the centering pins and the lengths of the rigid arms when in horizontal positions cooperating to fix the positions of said coupling means with respect to the axis of the respective wheel regardless of whether the wheels are in the straight ahead or turned positions, the biased connection establishing a reference line relative to the position of the respective rigid arm which is an indication of the toe-in of the respective wheel, and indicating means carried in fixed position on each of the rigid arms to provide readings which are indicative of the angular positions of the wheels.

4. A portable instrument as set forth in claim 3 including a sight carried by each rigid arm for viewing reference points at the rear of the vehicle.

5. An instrument adapted to be mounted on the front wheel hubs of a vehicle above the ground and without direct support from the ground comprising a pair of rigid arms which, when the wheels are in the straight ahead position, extend forwardly from the wheel hubs along the sides of the vehicle to the front and then transversely toward each other part way across the front of the vehicle, the transverse portions of the rigid arms being in front of and out of contact with the front wheels, mounting means connected to each of the rigid arms for attaching the respective rigid arm on the vehicle in a position above the ground and without direct support from the ground, each of the mounting means including a mounting head which abuts against a surface surrounding the wheel spindle and a centering pin which engages the end of the spindle, the surface surrounding the spindle defining a reference plane for the respective rigid arm, the mounting means permitting the arms to be pivotally adjusted with respect to the centering pins to level the rigid arms to substantially horizontal positions, a biased connection of variable length suspended across the front of the vehicle between the forward, inner ends of the rigid arms, detachable coupling means connecting the ends of the biased connection with the forward inner ends of the rigid arms, the detachable coupling means permitting adjustment of the rigid arms to substantially horizontal positions, the said reference planes, the fore-and-aft and transverse lengths of the rigid arms when in horizontal positions and the centering pins of the mounting heads cooperating to determine the positions of said coupling means with respect to the vehicle, regardless of whether the wheels are in the straight ahead or turned positions, the biased connection establishing a reference line relative to the position of the respective rigid arm which is an indication of the toe-in of the respective wheel, the positions of the coupling means with respect to the vehicle being such as to prevent angular orientation of the biased connection with respect to the vehicle when the front wheels are turned to the right or to the left from the straight ahead position, and indicating means carried in fixed position on each of the rigid arms to provide readings which are indicative of the angular positions of the wheels.

6. A portable instrument for testing wheel alignment of vehicles comprising a pair of side arms extending forwardly to the front of the vehicle, wheel engaging heads formed thereon, means defining a recess in each of said heads for receiving the spindle upon which the wheel of the vehicle is mounted, said heads abutting the wheel hubs, adjustable sights carried by each of the heads for checking tracking, means for checking camber, caster and king pin inclination carried by said side arms, additional means for supporting said side arms in a relatively horizontal position, an indicator carried by each side arm for measuring the angular position of the respective wheel, said indicator including a member pivotally mounted on the forward end of each of the side arms, a resiliently extensible connector suspended between the pivotal members to prevent angular displacement of said pivotal members with respect to the connector when the wheels are rotated, and cooperating engageable means carried by said connector and said pivotal members disconnectable when it is desired to remove the connector from between the pivotal members.

7. A portable instrument as set forth in claim 6 including a sight supported by the connector to permit the alignment of the frame and housings of the vehicle to be checked.

8. An instrument for checking wheel alignment and the condition of the frame of a vehicle comprising a yielding connection extending across one end of a vehicle, said yelding connection including a plurality of connected elements and spring means for maintaining one of said elements in centered position with respect to the end of the vehicle, support arms attached to opposite sides of the vehicle for supporting the yielding connection therebetween, means carried by each support arm and engageable with the respective wheel hub of the vehicle to be tested for registering the position of the support arm, a pivotal coupling between each of the support arms and the respective end of the yielding connection, a toe-in scale associated with each of the support arms which provides a reading which is a function of the angular relationship between the respective support arm and the yielding connection, an adjustable rider mounted on the centered element of the yielding connection, said rider being adjustable transversely of the vehicle, and a sight supported from the adjustable rider for viewing an objective at the opposite end of the vehicle.

9. An instrument for checking wheel alignment and the condition of the frame of a vehicle comprising a yielding connection extending transversely across the front of the vehicle, said yielding connection including a plurality of elongated elements in telescoping relationship and spring means acting between each pair of telescoping elements, support means attached to the front wheel hubs at opposite sides of the vehicle for supporting the yielding connection at both ends, each of the support means extending forwardly from the respective front wheel hub to the front of the vehicle, indicia means marking the mid-point between opposite ends of the yielding connection, a rider adjustably mounted on the yielding connection for movement relative to said indicia means and transversely of the front of the vehicle, a sight supported from the adjustable rider for viewing an objective at the rear of the vehicle, and a sight pivotally supported on each of the support means for viewing an objective at the rear of the vehicle.

10. An instrument as set forth in claim 9 including means for supporting the sight carried by the yielding connection for pivotal movement.

11. An instrument as set forth in claim 10 including a scale to measure the pivotal rotation of the sight carried by the yielding connection.

12. An instrument as set forth in claim 9 including a scale to measure the adjustment of the rider in either direction from the indicia means marking the mid-point between opposite ends of the yielding connection.

13. An instrument for checking wheel alignment and the condition of the frame of a vehicle comprising a pair of supports, one on each side of the vehicle, hub engaging means carried by each of said supports whereby the supports are positioned relative to the front hubs of the vehicle, each of said supports extending forwardly of the front end of the vehicle in a substantially horizontal plane, a member pivoted in a horizontal plane on each of the supports forward of the front end of the vehicle, a yielding connection extending across the front of said vehicle and connected at each end to one of the pivotal members, means marking the mid-point on the yielding connection between said supports, a sight adjustable on the yielding connection for movement transversely of the front end of the vehicle for viewing an objective at the rear of the vehicle, and a pivotal sight carried by each of the forwardly extending supports for viewing an objective at the rear of the vehicle.

14. An instrument as set forth in claim 13 including a toe-in scale for measuring pivotal movement of said member with respect to the forwardly extending support on which it is pivoted.

15. An instrument for checking wheel alignment and the condition of the frame of a vehicle comprising a yielding connection extending transversely across the front of the vehicle, said yielding connection including a plurality of elongated elements in telescoping relationship and spring means acting between each pair of telescoping elements, a pair of supporting arms attached to opposite sides of the vehicle, recessed heads carried by each of said supporting arms for mounting the respective arm on the wheel spindle in abutting engagement with the wheel hub of the vehicle to be tested, a liquid level carried by each of said arms to facilitate the leveling of the respective supporting arm, adjustable liquid levels carried by each of said supporting arms for determining camber, caster and king pin inclination, a pivotal member carried by the forward end of each of said supporting arms, said yielding connection extending between said pivotal members and determining the reference position of said pivotal members when the wheels are in the straight ahead position, a toe-in scale for measuring the pivotal movement of said pivotal member with respect to the forwardly extending supporting arm on which it is pivoted, indicia means marking the mid-point between opposite ends of the yielding connection, a rider adjustably mounted on the yielding connection for movement relative to said indicia means and transversely of the front of the vehicle, a slight supported from the adjustable rider for viewing an objective at the rear of the vehicle, a sight pivotally supported on each of the supporting arms for viewing an objective at the rear of the vehicle, and a scale for indicating the pivotally adjusted position of said sight.

16. An instrument as set forth in claim 15 including an auxiliary clamp engageable with the rim of the wheel and a connecting link between said auxiliary clamp and said supporting arm to lend additional support to the supporting arm and to facilitate leveling the supporting arm.

References Cited in the file of this patent

UNITED STATES PATENTS

| | | |
|---|---|---|
| 2,000,866 | Smith | May 7, 1935 |
| 2,000,993 | Schmidt | May 14, 1935 |
| 2,045,109 | Smith | June 23, 1936 |
| 2,097,310 | Sayles | Oct. 26, 1937 |
| 2,160,226 | Phillips | May 30, 1939 |
| 2,234,436 | King | Mar. 11, 1941 |
| 2,292,968 | Peters | Aug. 11, 1942 |
| 2,438,358 | Castiglia | Mar. 23, 1948 |
| 2,469,541 | Bagge et al. | May 10, 1949 |
| 2,481,420 | Hanson | Sept. 6, 1949 |
| 2,522,066 | Smith | Sept. 12, 1950 |
| 2,532,593 | Bender et al. | Dec. 5, 1950 |
| 2,575,194 | Smith | Nov. 13, 1951 |
| 2,581,021 | Jacobsen et al. | Jan. 1, 1952 |
| 2,704,894 | Rogers | Mar. 29, 1955 |
| 2,729,896 | Rosenblum | Jan. 10, 1956 |
| 2,732,626 | Knight | Jan. 31, 1956 |
| 2,755,554 | MacMillan | July 24, 1956 |

FOREIGN PATENTS

| | | |
|---|---|---|
| 394,090 | Great Britain | June 20, 1933 |

UNITED STATES PATENT OFFICE
CERTIFICATION OF CORRECTION

Patent No. 2,972,189              February 21, 1961

George M. Holub

It is hereby certified that error appears in the above numbered patent requiring correction and that the said Letters Patent should read as corrected below.

In the grant, upper right-hand corner thereof, for the patent number "2,872,189" read -- 2,972,189 --; column 1, line 60, strike out "of"; column 2, line 45, for "capabiilty" read -- capability --; line 50, for "inevntion" read -- invention --; column 8, line 59, for the claim reference numeral "12" read -- 1 --; column 12, line 7, for "slight" read -- sight --.

Signed and sealed this 25th day of July 1961.

(SEAL)
Attest:

ERNEST W. SWIDER
Attesting Officer

DAVID L. LADD
Commissioner of Patents